United States Patent

Toporcer et al.

Patent Number: 5,260,372
Date of Patent: Nov. 9, 1993

[54] FLAME RETARDANT ELASTOMERIC COMPOSITION

[75] Inventors: Louis H. Toporcer, Toledo; Mark R. Dibling, both of Toledo, Ohio

[73] Assignee: Wacker Silicones Corporation, Adrian, Mich.

[21] Appl. No.: 41,335

[22] Filed: Apr. 1, 1993

Related U.S. Application Data

[63] Continuation of Ser. No. 793,876, Nov. 18, 1991, abandoned.

[51] Int. Cl.⁵ .............................. C08K 3/04; C08K 3/10
[52] U.S. Cl. .................................. 524/785; 524/786; 524/863
[58] Field of Search ...................... 524/785, 786, 863

[56] References Cited

U.S. PATENT DOCUMENTS

| | | | |
|---|---|---|---|
| 4,102,852 | 7/1978 | De La Torre et al. | 524/860 |
| 4,156,674 | 3/1979 | Sumimura | 524/863 |
| 4,748,166 | 5/1988 | Gautier et al. | 524/786 |

Primary Examiner—Melvyn I. Marquis
Assistant Examiner—Karen A. Dean

[57] ABSTRACT

Silicone compositions which, when exposed to atmospheric moisture at room temperature cure to form a flame retardant elastomer comprising (a) an organopolysiloxane having terminal hydroxyl groups, (b) a cross-linking agent having an average of at least three functional groups linked to a silicon atom per molecule, in which the functional groups are selected from the group consisting of hydrocarbonoxy groups, amine groups, aminoxy groups, oxime groups and mixtures thereof, (c) a condensation catalyst, (d) platinum metal or compound thereof, (e) carbon black, (f) alumina hydrate and optionally (g) a filler.

The resultant flame retardant silicon elastomers are useful as insulation for electrical equipment, as encapsulants and as sealants where flame retardancy is necessary.

9 Claims, No Drawings

FLAME RETARDANT ELASTOMERIC COMPOSITION

This application is a continuation of application Ser. No. 07/793,876, filed Nov. 18, 1991, now abandoned.

The present invention relates to a room temperature curable organopolysiloxane composition, particularly to a room temperature organopolysiloxane composition which cures to an elastomer having flame retardant properties and more particularly to a self-leveling organopolysiloxane composition which cures to a flame retardant elastomer.

BACKGROUND OF THE INVENTION

Organopolysiloxanes which have flame retardant properties are known in the art. For example U.S. Pat. No. 3,514,424 to Noble et al., describes a flame retardant composition containing a silicone elastomer free of silicon bonded hydrogen, a filler and a small amount of a platinum-containing material.

U.S. Pat. No. 3,652,488 to Harder describes a flame resistant silicone elastomer containing (a) a polydiorganosiloxane gum, (b) a reinforcing filler, (c) an organic peroxide, (d) platinum and (e) carbon black, in which the flame resistant composition is free of silicon bonded hydrogen atoms.

U.S. Pat. No. 3,734,881 to Shingledecker describes a one-component self-extinguishing silicone elastomer which comprises (a) a hydroxyl endblocked polydimethylsiloxane, (b) a silica or titanium dioxide filler, (c) a silane of the formula $RSiY_3$, where R is a vinyl radical and Y is a radical selected from an acetoxy radical and a ketoxime radical, (d) carbon black and (e) a platinum compound, in which the composition is free of tin, mercury, bismuth, copper and sulfur.

U.S. Pat. No. 3,840,492 to Smith et al., discloses a flame retardant organopolysiloxane composition comprising (a) an organopolysiloxane containing silicon-bonded hydroxyl and/or alkoxy groups and a silicon-bonded organic radical selected from aryl, alkaryl, aralkyl and halogenated derivatives thereof, (b) an organotriacyloxysilane or an organosilicate or liquid partial hydrolysis products of said organosilicate and (c) a platinum containing material.

U.S. Pat. No. 3,936,476 to Itoh et al., describes flame retardant compositions containing (a) an organopolysiloxane containing Si-bonded vinyl groups, (b) methyhydrogenpolysiloxanes having at least two SiH groups per molecule, (c) finely divided silica filler, (d) finely divided manganese carbonate and (e) platinum or a platinum compound.

U.S. Pat. No. 4,102,852 to DeLaTorre et al., describes a self extinguishing room temperature curable silicone rubber composition containing (a) a silanol endblocked diorganopoysiloxane polymer, (b) zinc oxide, (c) filler, (d) an alkoxy functional crosslinking agent, (e) carbon black, (f) platinum and (g) a titanium chelate catalyst.

U.S. Pat. No. 4,310,444 to Hamada et al., describes a flame retardant silicone rubber containing (a) an organopolysiloxane, (b) a finely pulverized silica filler, (c) platinum compound, (d) fatty acid compound and (e) an organic peroxide.

OBJECT OF THE INVENTION

It is an object of the present invention to provide an elastomer having improved flame retardant properties. Another object of the present invention is to provide an elastomer which has flame retardant properties that are better than elastomers containing platinum and/or carbon black. Still another object of the present invention is to provide organopolysiloxane compositions which can be cured in the presence of tin catalysts to form elastomers having flame retardant properties. A further object of the present invention is to provide an organopolysiloxane composition which cures at room temperature to form an elastomer having improved flame retardant properties. A still further object of the present invention is to provide a self-leveling organopolysiloxane composition which cures to a flame retardant elastomer.

SUMMARY OF THE INVENTION

The foregoing objects and others which will become apparent from the following description are accomplished in accordance with this invention, generally speaking, by providing a silicone composition which when cured to a silicone elastomer, has improved flame retardant properties comprising (a) an organopolysiloxane containing an average of at least two silicon bonded hydroxyl groups per molecule, (b) a crosslinking agent having an average of three silicon bonded functional groups selected from the group consisting of oxime, amine, aminoxy, hydrocarbonoxy groups and mixtures thereof, (c) a condensation catalyst, (d) a platinum metal or compound, (e) carbon black, (f) alumina hydrate and (g) optionally a filler.

DESCRIPTION OF THE INVENTION

The organopolysiloxanes (a) used in the process for preparing the organopolysiloxane compositions of this invention may be any diorganopolysiloxane which could have been used heretofore in diorganopolysiloxane-based compositions which could be cross-linked by the addition of silicon-bonded functional groups to form elastomers. Diorganopolysiloxanes which may be used are preferably those of the general formula:

$$HO(SiR_2O)_nH$$

wherein R represents the same or different monovalent hydrocarbon radical or a substituted monovalent hydrocarbon radical having up to 18 carbon atoms, and n is an integer having a value of at least 5.

Although this is generally not shown in the above formula, the siloxane chain of the aforementioned diorganopolysiloxanes may contain siloxane units in addition to the diorganosiloxane units ($SiR_2O$). Examples of such other siloxane units, which are generally present only as impurities, are those corresponding to the $RSiO_{3/2}$, $R_3SiO_{1/2}$ and $SiO_{4/2}$, where R is the same as above. It is however, preferred that such other siloxane units be present in an amount less than 5 mol percent. Still other siloxane units, for example, those of the formula $—SiR_2R'SiR_2O—$, where R is the same as above and R' is a divalent hydrocarbon radical, for example, a phenyl radical, may be present in larger amounts.

It is preferred that the hydrocarbon radicals represented by R contain from 1 to 18 carbon atoms.

Examples of hydrocarbon radicals represented by R are alkyl radicals, for example, the methyl and ethyl radical, as well as propyl, butyl, hexyl and octadecyl radicals; alkenyl radicals such as the vinyl, allyl, ethylallyl and butadienyl radicals; aryl radicals such as the phenyl radical; alkaryl radicals such as the tolyl radicals; and aralkyl radicals such as the beta-phenylethyl radical.

Examples of substituted monovalent hydrocarbon radicals represented by R are halogenated hydrocarbon radicals, such as the 3,3,3-trifluoropropyl radical, chlorophenyl and bromotolyl radicals; and cyanoalkyl radicals, such as the beta-cyanoethyl radical.

Because of their availability, it is preferred that at least 80 percent of the R radicals be methyl radicals.

The organopolysiloxanes preferably contain from about 1.8 to 2.2 organic groups per silicon atom.

The organopolysiloxanes employed in this invention can be homopolymers i.e., only one species of siloxane unit is present, or a copolymer containing two or more different species of siloxane units. Also, the organopolysiloxanes can be a mixture of homopolymers and/or copolymers.

The organopolysiloxanes may range in viscosity from about 5 mPa.s at 25° C. and more preferably from about 500 to about 100,000 mPa.s at 25° C. Thus, the organopolysiloxanes can range from low viscosity liquids to non-flowing benzene soluble gums. Of course, the particular physical state of the polymer will vary depending upon the end use of the composition.

In preparing the compositions of this invention, it is possible to use as cross-linking agents, the same silicon compounds having an average of at least 3 Si-bonded functional groups per molecule, which could have been used heretofore in the preparation of compositions which can be stored under anhydrous conditions, but when exposed to moisture at room temperature, cross-link to form elastomers.

Cross-linking agents (b) which may be employed in the compositions of this invention are (i) silanes of the formula $R_mSi(Z)_{4-m}$, (ii) partial hydrolyzates of said silanes having from 2 to 10 silicon atoms per molecule, and (iii) mixtures of the silanes where R is the same as above. Z is a functional group and m is an integer of from 0 to less than 2.

Examples of functional groups represented by Z are hydrocarbonoxy and substituted hydrocarbonoxy groups (—OR′), hydrocarbonoxy-hydrocarbonoxy groups (—OR″—OR′), where R″ is a divalent hydrocarbon radical having from 2 to 8 carbon atoms, aminoxy groups (—ONR′$_2$), amine groups (—NR‴$_2$) and oxime groups (—ON=CR‴$_2$), in which R′ represents the same or different monovalent or substituted monovalent hydrocarbon radicals and R‴ represents hydrogen or R′.

The hydrocarbon radicals represented by R′ and R‴ have from 1 to 18 carbon atoms and more preferably from 1 to 10 carbon atoms.

The examples of hydrocarbon radicals represented by R also apply to the hydrocarbon radicals represented by R′ and R‴.

Examples of hydrocarbonoxy radicals are alkoxy radicals having from 1 to 18 carbon atoms and more preferably from 1 to 10 carbon atoms are methoxy, ethoxy, n-propoxy, isopropoxy, butoxy, hexyloxy, heptyloxy, octyloxy, tetradecyloxy and octadecyloxy radicals as well as hydrocarbonoxy radicals such as vinyloxy, allyloxy, ethylallyloxy, isopropenyloxy, butadienyloxy and phenoxy groups.

An example of a hydrocarbonoxy-hydrocarbonoxy radical is the methoxyethyleneoxy group.

Examples of aminoxy groups are dimethylaminoxy, diethylaminoxy, dipropylaminoxy, dibutylaminoxy, dioctylaminoxy, diphenylaminoxy, ethylmethylaminoxy and methylphenylaminoxy groups.

Examples of amine compounds are n-butylamino, sec-butylamino and cyclohexylamino groups.

Examples of oxime compounds are acetaldoxime, acetophenonoxime, acetonoxime, benzophenonoxime, 2-butanonoxime, diisopropylketoxime and chlorocyclohexanonoxime groups.

Examples of cross-linking agents (b) are tetraethoxysilane, methyltrimethoxysilane, methyltriethoxysilane, methyltripropoxysilane, methyltributoxysilane, ethyltrimethoxysilane, ethyltriethoxysilane, ethyltri-n-propoxysilane, propyltriethoxysilane, propyltri-n-propoxysilane, butyltrimethoxysilane, butyltriethoxysilane, isobutyltrimethoxysilane, isobutyltriethoxysilane, n-hexyl trimethoxysilane, cyclohexyltrimethoxysilane, benzyltrimethoxysilane, phenyltrimethoxysilane, phenyltriethoxysilane, octyltrimethoxysilane, octyltriethoxysilane, lauryltrimethoxysilane, 2-ethylhexyltrimethoxysilane, decyltrimethoxysilane, dodecyltrimethoxysilane, tetradecyltriethoxysilane, hexadecyltriethoxysilane, octadecyltriethoxysilane as well as mixtures of the above silanes and mixtures of the above silanes with silanes such as diethyldiethoxysilane, dimethyldipropoxysilane, di-isopropyldiisopropoxysilane, dibutyldimethoxysilanes, di-isobutyldimethoxysilane, octylmethyldi-isopropoxysilane and partial hydrolyzates thereof.

Examples of suitable amine cross-linking agents (b) are methyl tris-(sec-butylamine)silane, methyl tris-(n-butylamino)silane, methyl tris-(n-heptylamino)silane, methyl tris-(cyclohexylamino)silane, phenyl tris-(3,5,5-trimethylcyclohexylamino)silane, tetra-(n-butylamino)silane and partial hydrolyzates thereof.

Examples of suitable aminoxy cross-linking agents (b) are methyl tris-(diethylaminoxy)silane, ethyl tris-(dimethylaminoxy)silane, methyl tris-(dipropylaminoxy)silane, methyl tris-(dibutylaminoxy)silane, ethyl tris-(diethylaminoxy)silane, ethyl tris(dipropylaminoxy)silane, ethyl tris-(dibutylaminoxy)silane and partial hydrolyzates thereof.

Examples of oxime compounds which may be employed as crosslinking agents (b) are methyl tris(acetophenoximo)silane, methyl tris-(acetoximo)silane, methyl tris-(benzophenoximo)silane, ethyl tris-(2-butanoximo)silane, methyl tris-(3-methyl-2-butanoximo)silane, propyl tris-(2-nonanoximo)silane, butyl tris-(5-methyl-2-hexanoximo)silane, tetrakis(acetoximo)silane and partial hydrolyzates thereof.

The crosslinking agents (b) may be employed as a single species or mixtures of the various cross-linking agents may be employed.

Other cross-linking agents (b) which may be employed are partial hydrolyzates of the silanes (i) having from 2 to 10 silicon atoms. Examples of partial hydrolyzates of the silanes are hexamethoxydisilane, dimethyltetraethoxydisiloxane, dimethyldiphenylhexylethoxytetrasiloxane and alkoxy containing organopolysiloxanes having up to 10 carbon atoms.

The partial hydrolyzates (ii) may be employed alone or in admixture with silanes (i).

The silanes, partial hydrolyzates or mixtures thereof may be employed in an amount of from about 0.2 to about 15 parts by weight and more preferably from about 1 to 10 parts by weight per 100 parts by weight of the organopolysiloxane (a).

Catalysts (c) which may be employed in the compositions to accelerate curing are carboxylic acid salts of a metal ranging from lead to manganese, inclusive, in the electromotive series of metals. The particular metals included within the scope are lead, tin, nickel, cobalt, iron, cadmium, chromium, zinc and manganese. The specific metal ion which is preferred is tin. The carboxylic acids from which the salts of these metals are derived can be monocarboxylic acids or dicarboxylic acids and the metallic salts can either be soluble or insoluble in the organopolysiloxane. Preferably, the salts employed are soluble in the organopolysiloxane since this facilitates the uniform dispersion of the salt in the reaction mixture.

Illustrative of metal salts which can be employed in accordance with the present invention are, for example, zinc naphthenate, lead naphthenate, cobalt naphthenate, iron 2-ethylhexoate, cobalt octoate, zinc octoate, lead octoate, chromium octoate and tin octoate. Metal salts operative in the practice of the present invention include those in which the metallic ion contains a hydrocarbon substituent, such as, for example, carbomethoxyphenyl tin trisuberate, isobutyl tin triceroate, cyclohexenyl lead triacotinate, xenyl lead trisalicylate, dimethyl tin dibutyrate, dibutyl tin diacetate, dibutyl tin dilaurate, divinyl tin diacetate, dibutyl tin dibenzoate, dibutyl tin dioctoate, dibutyl tin maleate, dibutyl tin adipate, diisoamyl tin bistrichlorobenzoate, diphenyl lead diformate, dibutyl tin dilactate, dicyclopentyl lead bis-monochloroacetate, dibenzyl lead di-2-pentanoate, diallyl lead di-2-hexanoate, triethyl tin tartrate, tributyl tin acetate, triphenyl tin acetate, tricyclohexyl tin acrylate, tritolyl tin terephthalate, tri-n-propyl lead acetate, tristearyl lead succinate, trinaphthyl lead p-methylbenzoate, tris-phenyl lead cyclohexenyl acetate, triphenyl lead ethylmalonate, etc.

When the silane crosslinking agent (b) has the formula $R_mSi(Z)_{4-m}$ where Z is an alkoxy function group (OR') or (OR"OR'), where R' and R" are the same as above or partial hydrolyzates thereof, it is preferred that a titanium ester or partial hydrolyzates thereof be employed.

Titanium compounds which may be employed in the compositions of this invention are titanium esters having the formula $Ti(OR')_4$, where R' is the same as above. Specific examples of titanium esters which may be employed are titanium esters of monohydric alcohols, such as tetramethyltitanate, tetraethyltitanate, tetraisopropyltitanate, tetrabutyltitanate, tetra-(2-ethylhexyl)titanate, tetrahexyltitanate and tetraoctyltitanate. Partial hydrolyzates of any of the above titanates as well as polymeric titanates having the formula —Ti—O—Ti— may be employed.

The amount of catalyst which may be employed in the present invention is a function of the increased rate of curing desired so that any amount of catalyst up to the maximum effective amount for increasing the cure rate can be employed. In general, no particular benefit is derived from employing more than about 5 percent by weight of catalyst based on the weight of the organopolysiloxane (a). Preferably, the amount of catalyst ranges from about 0.01 percent to 2.0 percent by weight, based on the weight of the organopolysiloxane (a).

The compositions of this invention also contain platinum and/or platinum compounds or complexes. The platinum and/or platinum compounds may be dispersed on carriers, such as silicon dioxide, aluminum oxide or activated carbon. Furthermore, it is possible to use compounds or complexs of these metals, such as $PtCl_4$, $H_2PtCl_6.6H_2O$, $Na_2PtCl_4.4H_2O$, platinum-olefin complexes, platinum-alcohol complexes, platinum-alcoholate complexes, platinum-ether complexes, platinum-aldehyde complexes, platinum-ketone complexes, ammonium platinum complexes, platinum-vinylsiloxane complexes, especially platinum-divinyltetramethyldisiloxane complexes with or without any detectable, inorganically bonded halogen and trimethylenedipyridine platinum dichloride.

When platinum and/or complexes of platinum are used to promote flame retardancy, platinum and/or platinum complexes are used in an amount such that from 0.2 to 500 ppm (parts per million by weight), calculated as metallic platinum and based on the weight of the organopolysiloxane (a) are employed.

The compositions of this invention likewise contain carbon black (d) such as acetylene carbon black, lamp black, fine thermal carbon black, furnace carbon black, or channel carbon black.

The amount of carbon black which may be present in the composition may range from about 1 to 20 parts of carbon black, preferably from 1.5 parts and more preferably from 5 to 10 parts by weight based on 100 parts by weight of the organopolysiloxane (a).

The carbon black can have a surface area of at least 10 $M^2/g$ and a particle size of from 0.05 to 0.20 micron.

The composition also contains alumina hydrate in an amount of from about 50 to 150 parts by weight, preferably from 70 to 130 parts by weight and more preferably from 100 to 125 parts by weight based on 100 parts by weight of organopolysiloxane (a).

The alumina hydrate is preferably the trihydrate $Al_2O_3.3H_2O$ which has a high surface area. Preferably the specific surface area of the alumina hydrate is at least 3 $M^2/g$ and more preferably has a surface area greater than 6 $M^2/g$. A specific surface area of from 8 to 20 $M^2/g$ is especially preferred, although lower surface areas will yield acceptable results. However, it is preferred that the surface area not be below about 2.0 $M^2/g$ in order to obtain an elastomer having acceptable flame retardancy.

The hydrated alumina preferably has a maximum particle size less than about 4 microns and more preferably less than about 2 microns; however the average particle size may range from about 0.5 to about 50 microns.

Treated alumina hydrate; i.e., alumina hydrate which has been pretreated with cyclic polysiloxanes, such as octamethylcyclotetrasiloxane or treated with silazanes or a combination of silazanes and cyclic polysiloxanes and other treating agents such as metallic stearates which are well known in the art, may be employed in the compositions of this invention.

In addition to the organopolysiloxane (a), cross-linking agent (b), catalyst (c), platinum metal, compound or complex (d), carbon black (e), alumina hydrate (f), the compositions may optionally contain fillers (g). Fillers which may be employed are reinforcing fillers. Examples of reinforcing fillers, that is fillers having a surface area of at least 50 $M^2/g$, are pyrogenically produced silicon dioxide, silicon dioxide aerogels, that is to say, silicic acid hydrogels dehydrated so as to maintain the structure, and precipitated silicon dioxide. Examples of non-reinforcing fillers, that is fillers having a surface area of less than 50 $M^2/g$, are calcium carbonate, quartz powder, diatomaceous earth, titanium dioxide, zirconium silicate, aluminum silicate, zinc oxide, plaster of paris, so-called "molecular sieves", and asbestine, that is to say a magnesium-calcium silicate which resembles talc. All these fillers, but especially the reinforcing fillers, can have organosilyl groups on their surface if they have been pretreated, for example, with trimethylhalogenosilanes, as described in, for example U.S. Pat. No. 2,610,167, or if they have been manufactured, for example, by reaction of aqueous silica sols with organohalogenosilanes, or have been rendered hydrophobic in some other way.

Also, the fillers may be treated with other silicon compounds, such as hexamethyldisilazane and vinyltrialkoxysilanes to impart organosilyl groups to the surfaces of the treated fillers.

Preferably, the fillers are used in amounts of from 0 to 200 percent by weight, especially from 5 to 150 percent by weight, based on the total weight of organopolysiloxane (a). Non-reinforcing fillers are generally used in amounts of at least 20 percent by weight, based on the total weight of the organopolysilxaone (a), whereas reinforcing fillers are generally used in amounts of from 1 to 50 percent by weight, based on the total weight of the organopolysiloxane (a). It is, however, possible to use larger amounts of reinforcing fillers provided that the workability of the compositions does not suffer as a result. The amount of reinforcing fillers may exceed 50 percent by weight, if for example, the fillers have been obtained from the reaction of aqueous silica sols with organohalogenosilanes.

The composition of this invention may also contain fibrous fillers, such as glass fibers having an average length up to about 0.5 mm, and/or asbestos fibers.

Other additives which may be employed in the compositions of this invention are pigments, soluble dyes, scents, organopolysiloxane resins, including those comprising $(CH_3)_3SiO_{1/2}$ and $SiO_{4/2}$ units, purely organic resins such as powders of homopolymers or copolymers of acrylonitrile, polyvinylchloride, corrosion inhibitors, oxidation inhibitors, heat stabilizers, solvents, additional agents which serve to improve the adhesion of the compositions to the surfaces on which they are applied, such as, for example, gamma-glycidoxypropyltriethoxysilane, plasticizers such as trimethylsiloxy terminated organopolysiloxanes which are fluid at room temperature and the like.

The order of addition of the ingredients to form the compositions is not critical and they can be prepared under anhydrous conditions in any conventional manner known in the art. The method of addition as well as the sequence of addition is not critical; however, it is preferred that the crosslinking agent be added as one of the last ingredients to the composition.

Conventional methods for forming homogenous mixtures may be employed, such as combining the organopolysiloxane (a) with the carbon black (e) aluminum hydrate (f) and optionally filler (g) and then adding the other ingredients to the mixture. The platinum compounds can conveniently be added by mixing with a diluent such as organopolysiloxane fluids to assist in dispersion because the amount used is very small. After the ingredients are mixed, the composition is stored under anhydrous conditions until it is desired to cure the composition, then the composition is exposed to moisture, such as atmospheric moisture, and cured to a flame retardant elastomer. If desired the composition may be heated to an elevated temperature to accelerate curing of the composition. Temperatures of from 30° to 100° C., and more preferably of from 40° to 75° C. may be used to cure the compositions to form elastomers having flame retardant properties.

Another embodiment of this invention is the preparation of a self-leveling organopolysiloxane which cures to a flame retardant elastomer. The self-leveling composition comprises (a) an organopolysiloxane having terminal hydroxyl groups and a viscosity of from about 1,000 to 6,000 mPa.s at 25° C., (b) a crosslinking agent having an average of at least three silicon bonded functional groups, (c) a condensation catalyst, (d) a platinum metal or compound, (e) carbon black and (f) alumina hydrate in an amount of from 80 to 110 parts by weight based on the weight of organopolysiloxane (a). The resultant composition has the ability to self-level and when exposed to atmospheric moisture cures to a flame retardant elastomer.

The ingredients employed in the self-leveling organopolysiloxane composition are the same ingredients which are used in the preparation of an organopolysiloxane which cures to a flame retardant elastomer.

It was unexpectedly found that the room temperature curable compositions of the present invention formed elastomers which are flame retardant. Alumina hydrate without platinum and carbon black does not provide an elastomer having flame retardent properties. Alumina hydrate and carbon black does not provide an elastomer having satisfactory flame retardant properties. Alumina hydrate and platinum likewise does not provide an organopolysiloxane elastomer having desirable flame retardant properties. The combination of alumina hydrate, carbon black and platinum provides an organopolysiloxane elastomer having excellent flame retardant properties. Likewise, the combination of alumina hydrate, carbon black, platinum and tin provides an organopolysiloxane elastomer having excellent flame retardant properties.

These flame retardant elastomeric compositions are useful as insulation for electrical equipment, as encapsulants, and as sealants where flame retardancy is desired or necessary. The self-leveling compositions are especially useful for filling crevices where a flame retardant elastomer is desired.

In the following examples, all parts are by weight unless otherwise specified. All temperatures are at 25° C. unless otherwise stated.

Preparation of Platinum Compounds (A) Preparation of platinum-vinylsiloxane complex About 20 parts of sodium bicarbonate were added to a mixture containing 10 parts of $H_2PtCl_6.6H_2O$, 20 parts of 1,3-divinyl-1,1,3,3-tetramethyldisiloxane and 50 parts of ethanol. The mixture was heated for 30 minutes to boiling under reflux while stirring, then allowed to stand for 15 hours and subsequently filtered. The volatile constituents were distilled off from the filtrate at about 16 hPa (abs). About 17 parts of a liquid were obtained as residue and the liquid was dissolved in benzene. The solution was filtered and the benzene was distilled off from the filtrate. The residue was blended with dimethylpolysiloxane having dimethylvinylsiloxane units as terminal units and having a viscosity of 1400 mPa.s at 25° C. as diluent in an amount such that the mixture contains 1 percent by weight of platinum, calculated as the element.

(B) Preparation of dicyclopentadiene-platinum dichloride

About 0.2 g of dicyclopentadiene-platinum dichloride is dissolved in 20 ml of methylene chloride. The solution is mixed with 100 g of a dimethylpolysiloxane having terminal vinyldimethylsiloxy units and a viscosity of 1000 mPa.s at 23° C. The mixture is stirred at room temperature and at 1 bar until the methylene chloride evaporates. The resultant mixture contains 1.2 percent of platinum, calculated as elemental platinum.

(C) Preparation of ammonium platinum complex

An aminofunctional silicone composition is prepared by heating a mixture containing about 226.4 parts of octamethylcyclotetrasiloxane, 22.4 parts of β-(aminoethyl)-gamma-aminopropyltrimethoxysilane and 0.29 parts of potassium hydroxide to a temperature of 145° C. for three hours. After cooling the liquid product to room temperature, 0.29 parts of acetic acid are added to neutralize the potassium hydroxide. The product is filtered and a liquid product having a viscosity of about 40 mPa.s at 25° C. is recovered. About 28.8 parts of the aminofunctional silicon composition prepared above are added to a reactor under an atmosphere of nitrogen. About 100 parts of isopropanol, 1.04 parts of chloroplatinic acid hexahydrate, and 45 parts of toluene are added to the reactor and the reaction mixture is stirred for 30 minutes at 27° C. The resultant transparent orange colored product contains 0.16 weight percent of platinum.

EXAMPLE 1

About 100 parts of hydroxyl terminated polydimethylsiloxane having a viscosity of about 80,000 mPa·s is mixed under anhydrous conditions with 3.4 parts of polyethylene glycol, 0.5 parts of platinum compound (A) above, 120.7 parts of alumina trihydrate having a particle size of 3.5 microns (available as Microl 632 SP from Solem), 13.4 parts of carbon black (Shawinigan Black), 69 parts of a trimethylsiloxy endblocked polydimethylsiloxane having a viscosity of 100 mPa·s at 25° C., 23.4 parts of methyl tris(methylethylketoximo)-silane and 13.4 parts of fumed silica. After mixing the resultant mixture for 30 minutes under anhydrous conditions, 0.34 parts of dibutyltin diacetate is added as a catalyst and mixed for an additional 10 minutes under anhydrous condition. The resultant mixture is allowed to cure for 7 days at room temperature in the presence of atmospheric moisture.

The flame retardant properties are determined in accordance with the procedure described by Underwriters Laboratories in method UL-94 for the flammability of plastic materials. In determining the flame retardant properties, the cured sample of silicone elastomer is placed in a vertical position 9.5 mm above the top of a burner tube. The flame of the burner is adjusted so that a blue flame 19 mm in height is produced. The burner is located centrally under the lower end of the test sample and the flame allowed to remain in contact with the sample for 10 seconds. The burner is removed from the sample and the time the sample continues to flame is recorded. Immediately after the flaming ceases, the burner is placed under the sample for another 10 second period. Again, the burner is removed and the time the sample flames and the total time the sample flames and glows is recorded. The time after removal from the flame until the flame and glow of the sample goes out is recorded in seconds. Each time is an average of five samples. The results are shown in the Table.

EXAMPLE 2

The procedure of Example 1 is repeated except that 23.4 parts of methyl tris-(cyclohexylamino)silane are substituted for methyl tris-(methylethylketoximo)silane and the dibutyltin diacetate is omitted. The flame retardant properties are determined in accorrdance with the procedure of Example 1. The results are shown in the Table.

EXAMPLE 3

The procedure of Example 1 is repeated, except that 23.4 parts of methyltriethoxysilane are substituted for methyl tris-(methylethylketoximo)silane and 12 parts of tetrabutyltitanate are substituted for dibutyltin diacetate. The flame retardant properties are determined in accordance with the procedure of Example 1. The results are shown in the Table.

EXAMPLE 4

The procedure of Example 1 is repeated, except that 100 parts of alumina trihydrate are substituted for 120.7 parts of alumina trihydrate. The flame retardant properties are determined in accordance with the procedure of Example 1. The results are shown in the Table.

EXAMPLE 5

The procedure of Example 1 is repeated, except that 0.5 parts of platinum complex (B) are substituted for 0.5 parts of platinum complex (A). The flame retardant properties are determined in accordance with the procedure of Example 1. The results are shown in the Table.

EXAMPLE 6

The procedure of Example 5 is repeated except that 0.25 parts of platinum compound (B) are substituted for 0.5 parts of platinum compound (B). The flame retardant properties are determined in accordance with the procedure of Example 1. The results are shown in the Table.

EXAMPLE 7

The procedure of Example 1 is repeated, except that 6 parts of carbon black (Shawinigan Black) are substituted for 13.4 parts of carbon black. The flame retardant properties are determined in accordance with the procedure of Example 1. The results are shown in the Table.

EXAMPLE 8

The procedure of Example 1 is repeated except that 2 parts of the ammonium platinum complex (C) above, are substituted for the platinum compound (A) above. The flame retardant properties are determined in accordance with the procedure of Example 1. The results are shown in the Table.

EXAMPLE 9

The procedure of Example 1 is repeated except that 13.4 parts of carbon black (identified as LONZA Graphite Powder KS 6, available from LONZA LTD.) are substituted for 13.4 parts of carbon black (Shwanigan Black). The flame retardant properties are determined in accordance with the procedure of Example 1. The results are shown in the Table.

EXAMPLE 10

The procedure of Example 1 is repeated except that the hydroxyl terminated polydimethylsiloxane has a viscosity of about 6,000 mPa·s at 25° C. Also, 110 parts of alumina trihydrate are substituted for the 120.7 parts of alumina trihydrate. The 3.4 parts of polyethylene glycol and 13.4 parts of fumed silica are omitted. The flame retardant properties are determined in accordance with the procedure of Example 1. The results are shown in the Table.

EXAMPLE 11

The procedure of Example 10 is repeated except that 2 parts of the ammonium platinum complex (C) above, are substituted for the platinum compound (A) above. The flame retardant properties are determined in accordance with the procedure of Example 1. The results are shown in the Table.

EXAMPLE 12

The procedure of Example 1 is repeated except that 0.5 parts of cloroplatinic acid $H_2PtCl_6 \cdot 6H_2O$ is substituted for platinum compound (A). The resultant composition exhibited flame retardant properties.

COMPARISON EXAMPLE $V_1$

The procedure of Example 1 is repeated except that the carbon black is omitted. The flame retardant properties are determined in accordance with the procedure of Example 1. The results are shown in the Table.

COMPARISON EXAMPLE $V_2$

The procedure of Example 1 is repeated except that the alumina trihydrate is omitted. The flame retardant properties are determined in accordance with the procedure of Example 1. The results are shown in the Table.

COMPARISON EXAMPLE $V_3$

The procedure of Example 1 is repeated except that the platinum compound (A) is omitted. The flame retardant properties are determined in accordance with the procedure of Example 1. The results are shown in the Table.

COMPARISON EXAMPLE $V_4$

The procedure of Example 1 is repeated except that the platinum compound (A) and the carbon black are omitted. The flame retardant properties are determined in accordance with the procedure of Example 1. The results are shown in the Table.

COMPARISON EXAMPLE $V_5$

The procedure of Example 1 is repeated except that 120.7 parts of aluminum oxide particles are substituted for the 120.7 parts of alumina trihydrate. The flame retardant properties are determined in accordance with the procedure of Example 1. The results are shown in the Table.

COMPARISON EXAMPLE $V_6$

The procedure of Example 1 is repeated except that 23.4 parts of ethyltriacetoxysilane are substituted for 23.4 parts of methyl tris-(methylethylketoximo)silane. The flame retardant properties are determined in accordance with the procedure of Example 1. The results are shown in the Table.

TABLE

| | First Application Flame. (sec.) | Second Application Flame. (sec.) | Second Application Flame/Glow (sec.) |
|---|---|---|---|
| Example No. | | | |
| 1 | 0 | 0 | 0 |
| 2 | 0 | 0 | 0 |
| 3 | 0 | 0 | 0 |
| 4 | 0 | 0.8 | 0.8 |
| 5 | 0 | 0 | 0 |
| 6 | 0 | 0 | 0 |
| 7 | 0 | 0 | 0 |
| 8 | 0 | 0 | 0 |
| 9 | 0 | 0 | 0 |
| 10 | 0 | 0 | 0 |
| 11 | 0 | 0 | 0 |
| Comparison Example No. | | | |
| $V_1$ | 4.4 | 1.4 | 3.6 |
| $V_2$ | >60 | — | — |
| $V_3$ | 1.2 | 2 | 3.2 |
| $V_4$ | 20.8 | 21.8 | 36.6 |
| $V_5$ | >60 | — | — |
| $V_6$ | 4 | 33 | >60 |

What is claimed is:

1. A room temperature curable composition which when exposed to atmospheric moisture forms a flame retardant silicone elastomer consisting of (a) an organopolysiloxane containing at least two silicon bonded hydroxyl group per molecule, (b) a cross-linking agent having an average of at least three functional groups linked to a silicon atom per molecule, in which the functional groups are selected from the group consisting of hydrocarbonoxy groups, amine groups, aminoxy groups, oxime groups and mixtures thereof, (c) a condensation catalyst, (d) a platinum metal or compound thereof, which is present in an amount of from 0.2 to 500 parts per million by weight based on elemental platinum per 100 parts to weight of organopolysiloxane (a), (e) carbon black in an amount of from 1 to 20 parts by weight per 100 parts by weight of organopolysiloxane (a), (f) alumina hydrate in an amount of from 50 to 150 parts by weight per 100 parts by weight of organopolysiloxane (a) and optionally (g) a reinforcing and/or non-reinforcing filler.

2. The composition of claim 1, wherein the organopolysiloxane (a) is represented by the general formula $$HO(SiR_2O)_nH$$

where R is selected from the group consisting of a monovalent hydrocarbon radical and a substituted monovalent hydrocarbon radical having from 1 to 18 carbon atoms, and n is an integer having a value of at least 5.

3. The composition of claim 1, wherein the cross-linking agent (b) is selected from the group consisting of (i) silanes of the formula $R_mSiZ_{4-m}$, (ii) partial hydrolyzates thereof having from 2 to 10 silicon atoms per molecule and (iii) mixtures thereof, where R is selected from the group consisting of a monovalent hydrocarbon radical and a substituted monovalent hydrocarbon radical having from 1 to 18 carbon atoms, Z is a functional group selected from the group consisting of hydrocarbonoxy groups, amine groups, aminoxy groups, oxime groups and mixtures thereof, and m is an integer of from 0 to less than 2.

4. The composition of claim 1, wherein the condensation catalyst is a metal salt of a carboxylic acid.

5. The composition of claim 1, wherein the cross-linking agent contains hydrocarbonoxy functional groups and the catalyst is a titanate ester.

6. The composition of claim 1, wherein the platinum is present in an amount of from 0.2 to 500 parts per million, calculated as metallic platinum and based on the weight of organopolysiloxane (a).

7. The composition of claim 1, wherein the carbon black is present in an amount of from about 1 to 20 parts by weight based on 100 parts by weight of organopolysiloxane (a).

8. The composition of claim 1, wherein the alumina hydrate is present in an amount of from 50 to 150 parts by weight based on 100 parts by weight of organopolysiloxane (a).

9. A self-leveling room temperature curable composition which exposed to atmospheric moisture forms a flame retardant silicone elastomer consisting of (a) an organopolysiloxane containing at least two silicon bonded hydroxyl groups per molecule having a viscosity of from 1,000 to 6,000 mPa·s at 25° C., (b) a cross-linking agent having an average of at least three functional groups linked to a silicon atom per moolecule, in which the functional groups are selected from the group consisting of hydrocarbonoxy groups, amine groups, aminoxy groups, oxime groups and mixtures thereof, (c) a condensation catalyst, (d) a platinum metal or compouns thereof which is present in an amount of from 0.2 to 500 parts per million by weight based on elemental platinum per 100 parts by weight of organopolysiloxane (a), (e) carbon black in an amount of from 1 to 20 parts by weight per 100 parts by weight of organopolysiloxane (a), alumina hydrate in an amount of from 80 to 110 parts by weight per 100 parts by weight of organopolysiloxane (a).

* * * * *